United States Patent
Pannell et al.

(10) Patent No.: US 8,819,161 B1
(45) Date of Patent: Aug. 26, 2014

(54) AUTO-SYNTONIZATION AND TIME-OF-DAY SYNCHRONIZATION FOR MASTER-SLAVE PHYSICAL LAYER DEVICES

(75) Inventors: Donald Pannell, Cupertino, CA (US); Martin White, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 255 days.

(21) Appl. No.: 12/956,427

(22) Filed: Nov. 30, 2010

Related U.S. Application Data

(60) Provisional application No. 61/295,923, filed on Jan. 18, 2010.

(51) Int. Cl.
H04L 29/06 (2006.01)

(52) U.S. Cl.
USPC ........................................................ 709/208

(58) Field of Classification Search
USPC .................................. 709/219, 248; 375/356
See application file for complete search history.

(56) References Cited

U.S. PATENT DOCUMENTS

| | | | |
|---|---|---|---|
| 4,736,363 A | 4/1988 | Aubin et al. | |
| 5,187,591 A | 2/1993 | Guy et al. | |
| 5,187,597 A | 2/1993 | Kato et al. | |
| 5,621,726 A | 4/1997 | Murakimi | |
| 5,712,604 A | 1/1998 | Tada et al. | |
| 5,742,604 A | 4/1998 | Edsall et al. | |
| 5,790,554 A | 8/1998 | Pitcher et al. | |
| 5,946,308 A | 8/1999 | Dobbins et al. | |
| 5,959,990 A | 9/1999 | Frantz et al. | |
| 6,035,105 A | 3/2000 | McCloghrie et al. | |
| 6,049,528 A | 4/2000 | Hendel et al. | |
| 6,111,876 A | 8/2000 | Frantz et al. | |
| 6,115,356 A | 9/2000 | Kalkunte et al. | |
| 6,151,322 A | 11/2000 | Viswanath | |

(Continued)

FOREIGN PATENT DOCUMENTS

| | | | |
|---|---|---|---|
| EP | 1 227 623 A2 | 7/2002 | |
| EP | 1 227 623 A2 | 7/2002 | |

(Continued)

OTHER PUBLICATIONS

IEEE P158811™ D2.2; Draft Standard for a Precision Clock Synchronization Protocol for Networked 4 Measurement and Control Systems; 2007; pp. 1-285; Institute of Electrical and Electronics Engineers, Inc.; Piscataway, NJ.

(Continued)

*Primary Examiner* — Yemane Mesfin
*Assistant Examiner* — Derrick V Rose

(57) ABSTRACT

A network device includes a master physical layer and a slave physical layer device configured to communicate with a plurality of network devices. The master physical layer device includes a signal generator module configured to generate a first clock that is syntonized to a grandmaster clock having a fixed frequency; and a frequency adjusting module configured to, at a predetermined time interval, adjust a frequency of the first clock to the fixed frequency of the grandmaster clock. The slave physical layer device includes a time of day calculating module configured to calculate a first time of day of the slave physical layer device based on a second clock that is asynchronous to the first clock, and a period adjusting module configured to synchronize the first time of day to a second time of day of the master physical layer device based on the predetermined time interval.

17 Claims, 6 Drawing Sheets

(56) References Cited

U.S. PATENT DOCUMENTS

| | | | |
|---|---|---|---|
| 6,181,699 | B1 | 1/2001 | Crinion et al. |
| 6,192,397 | B1 | 2/2001 | Thompson |
| 6,252,849 | B1 | 6/2001 | Rom et al. |
| 6,389,468 | B1 | 5/2002 | Muller et al. |
| 6,405,258 | B1 | 6/2002 | Erimli et al. |
| 6,414,956 | B1 | 7/2002 | Szczepanek |
| 6,430,621 | B1 | 8/2002 | Srikanth et al. |
| 6,460,088 | B1 | 10/2002 | Merchant |
| 6,515,993 | B1 | 2/2003 | Williams et al. |
| 6,590,861 | B1 | 7/2003 | Vepa et al. |
| 6,628,613 | B1 | 9/2003 | Joung et al. |
| 6,639,901 | B1 | 10/2003 | Katzri et al. |
| 6,781,998 | B1 | 8/2004 | Karlsson |
| 6,975,627 | B1 | 12/2005 | Parry et al. |
| 6,999,415 | B2 | 2/2006 | Luijten et al. |
| 7,031,325 | B1 | 4/2006 | Williams |
| 7,046,627 | B1 | 5/2006 | Dejanovic et al. |
| 7,180,889 | B1 | 2/2007 | Kung et al. |
| 7,180,899 | B2 | 2/2007 | De Silva et al. |
| 7,243,171 | B2 | 7/2007 | Doshi et al. |
| 7,283,471 | B2 | 10/2007 | Gutierrez et al. |
| 7,424,012 | B2 | 9/2008 | Tzeng |
| 7,454,425 | B2 | 11/2008 | Che et al. |
| 7,680,053 | B1 | 3/2010 | Pannell et al. |
| 7,706,363 | B1 | 4/2010 | Daniel et al. |
| 8,204,083 | B2 * | 6/2012 | Lai et al. .................. 370/503 |
| 2001/0043565 | A1 | 11/2001 | Chen et al. |
| 2002/0018489 | A1 | 2/2002 | Ambe et al. |
| 2002/0065865 | A1 | 5/2002 | Gilbert |
| 2002/0136163 | A1 | 9/2002 | Kawakami et al. |
| 2002/0138628 | A1 | 9/2002 | Tingley et al. |
| 2002/0176357 | A1 | 11/2002 | Lay et al. |
| 2002/0176450 | A1 | 11/2002 | Kong et al. |
| 2003/0091042 | A1 | 5/2003 | Lor |
| 2003/0137982 | A1 | 7/2003 | Sala et al. |
| 2003/0172188 | A1 | 9/2003 | Hasegawa et al. |
| 2003/0185157 | A1 | 10/2003 | Chen et al. |
| 2003/0210651 | A1 | 11/2003 | Tzeng et al. |
| 2004/0047353 | A1 | 3/2004 | Umayabashi et al. |
| 2004/0179476 | A1 | 9/2004 | Kim et al. |
| 2004/0257995 | A1 | 12/2004 | Sandy et al. |
| 2005/0144328 | A1 | 6/2005 | McBeath |
| 2005/0207387 | A1 | 9/2005 | Middleton et al. |
| 2006/0056459 | A1 | 3/2006 | Stratton et al. |
| 2006/0280182 | A1 | 12/2006 | Williams et al. |
| 2007/0011343 | A1 | 1/2007 | Davis et al. |
| 2007/0286195 | A1 | 12/2007 | Ilnickl et al. |
| 2008/0117938 | A1 | 5/2008 | Erich et al. |
| 2008/0240113 | A1 | 10/2008 | Arad et al. |
| 2011/0013737 | A1 * | 1/2011 | Lee et al. .................. 375/356 |
| 2011/0035511 | A1 * | 2/2011 | Biederman .................. 709/248 |

FOREIGN PATENT DOCUMENTS

| | | | |
|---|---|---|---|
| EP | 01227623 | | 7/2002 |
| EP | 1 271856 | A1 | 1/2003 |
| EP | 1 271856 | A1 | 1/2003 |
| WO | WO-9641456 | A1 | 12/1996 |
| WO | WO-9641456 | A1 | 12/1996 |
| WO | WO-02088984 | A1 | 11/2002 |
| WO | WO-02088984 | A1 | 11/2002 |

OTHER PUBLICATIONS

Butner et al., "Nanosecond-Scale Event Synchronization Over Local-Area Networks"; Local Computer Networks; 2002; Proceedings, LCN 2002; 27th Annual IEEE Conference on 2002.11.6-8; 9 pages.

IEEE P802.1Qat/D1.0; Draft Standard for Local and Metropolitan Area Networks-Virtual Bridged Local Area Networks—Amendment 9: Stream Reservation Protocol (SRP); Sponsor LAN/MAN Standards Committee of the IEEE Computer Society; Prepared by the Audio/Video Bridging Task Group of IEEE 802.1; 42 pages; Jan. 17, 2008; IEEE P802.1Qat—Stream Reservation Protocol; pp. 1-3.

International Standard IEC 61588(E): 2004; First Edition 2004-09; IEEE 1588(E)TM 2002; Precision Clock Synchronization Protocol for Network Measurement and Control Systems Sponsor TC9—Technical Committee on Sensor Technology of the IEEE Instrumentation and Measurement Society; Approved Sep. 12, 2002; IEEE-SA Standards Board; 158 pages.

IEEE Std 802.Oct. 1998 (Revision IEEE Std 802.10-1992, incorporating IEEE Std. 802.10b-1992, 802.10e-1993, 802.10f-1993, 802.10g-1995, and 802.10h-1997) IEEE Standards fo Local and Metropolitan Area Networks: Standard for Interoperable LAN/MAN Security (SILS); LAN MAN Standards Committee of the IEEE Computer Society, Approved Sep. 17, 1998 by the IEEE SA-Standards Board, 116 pages.

IEEE Std 802.10g-1995 (Supplement to IEEE Std 802.10-1992) IEEE Standard for Local and Metropolitan Area Networks: Supplement to Standard for Interoperable LAN/MAN Security (SILS): Secure Data Exchange (Sde) - Security Label (Annexes 2I, 2J, and 2K), IEEE Computer Society, Apr. 16, 1996, 34 pages.

IEEE Std 802.3-2002 (Revision of IEEE Std 802.3 2000 Edition) IEEE Standard for Information Technology—Telecommunications and information exchange between systems—Local and metropolitan area networks'Specific Requirements, Part 3: Carrier sense multiple access with collision detection (CSMA/CD) access method and physical layer specifications; IEEE Computer Society; LAN/MAN Standards Committee; Mar. 8, 2002; 578 pages.

802.3-2002 Part 2—Information Technology-Telecommunications and information exchange between systems—Local and metropolitan area networks—Specific Requirements—Part 3: Carrier Sense Multiple Access with Collision Detection (CSMA/CD) access method and physical layer specifications; Section Two; This section includes Clauses 21 through 33 and Annexes 22A through 32A.

802.Mar. 2002 Part 3—Information Technology—Telecommunications and information exchange between systems—Local and metropolitan area networks—Specific Requirements—Part 3: Carrier Sense Multiple Access with Collision Detection (CSMA/CD) access method and physical layer specifications—Section Three; This section includes Clauses 34 through 43 and Annexes 36A through 43C.

IEEE Std 802.3ac-1998 (Supplement to IEEE Std 802.3 1998 Edition) Information technology—Telecommunications and information exchange between systems—Local and metropolitan area networks—Specific requirements—Supplement to Carrier Sense Multiple Access with Collision Detection (CSMA/CD) Access Method and Physical Layer Specifications—Frame Extensions for Virtual Bridged Local Area Network (VLAN) Tagging on 802.3 Networks; LAN MAN Standards Committee of the IEEE Computer Society; Approved Sep. 16, 1998 by the IEEE-SA Standards Board; 19 pages.

D. Lee et al., "Floax-Flow-Rate Based Hop by Hop Backpressure Control for IEEE 802.3x," 5th IEEE International Conference on High Speed Networks and Multimedia Communications, Jul. 2002, pp. 202-207.

IEEE Computer Society, "*IEEE Standards For Local And Metropolitan Area Networks, Secure Data Exchange (SDE)—Security Label(Annexes 2I, 2J, and 2K)*",IEEE Std 802.10g-1995, Supplement to IEEE Std 802.10-1992, 24 pages.

IEEE Computer Society, "*IEEE Standards For Local And Metropolitan Area Networks, Secure Data Exchange (SDE) Sublayer Management (Subclause 2.8) and Recommended Practice for SDE on Ethernet V2.0 in IEEE 802 LANs (Annex 2H)*", IEEE Std 802.10e-1993 and IEEE Std. 802.10f-1993, 40 pages.

IEEE Computer Society, *IEEE Standards For Local And Metropolitan Area Networks, Standard For Interoperable LAN/MAN Security (SILS)* IEEE Std 802.10-1998, Revision of IEEE Std 802-10-1992 (Incorporating IEEE Std 802, 10b-1992, 802, 10e-1993, 802, 10f-1993, 802, 10g-1995 and 802, 10h-1997), 110 pages.

IEEE Computer Society, "*IEEE Standard for Inforrmation Technology—Telecommunications and Information Exchange Between Systems—Local and Metropolitan Area Networks—Specific Requirements—Part 3: Carrier Sense Multiple Access with Collision Detection (CSMA/CD) Access Method and Physical Layer Specifications*", IEEE Std 802.3—2002.

(56) References Cited

OTHER PUBLICATIONS

IEEE Computer Society, "*Information Technology—Telecommunications and Information Exchange Between Systems—Local and Metropolitan Area Networks—Specific Requirements—Supplement to Carrier Sense Multiple Access with Collision Detection (CSMA/CD) Access Method and Physical Layer Specifications—Frame Extensions for Virtual Bridged Local Area Network (VLAN) Tagging on 802.3 Networks*", IEEE Std 802.3ac—1998.

IEEE Computer Society, "*Information Technology—Telecommunications and Information Exchange Between Systems—Local and Metropolitan Area Networks—Common Specifications—Part 3: Media Access Control (MAC) Bridges: Revision*", IEEE P802.1D/D15—1997.

Butner et al., "Nanosecond-Scale Event Synchronization Over Local-Area Networks"; Local Computer Networks; 2002; Proceedings, LCN 2002; 27th Annual IEEE Conference on Nov. 6-8, 2002; 9 pages.

IEEE P802.1Qat/D1.0; Draft Standard for Local and Metropolitan Area Networks—Virtual Bridged Local Area Networks—Amendment 9: Stream Reservation Protocol (SRP); Sponsor LAN/MAN Standards Committee of the IEEE Computer Society; Prepared by the AudioNideo Bridging Task Group of IEEE 802.1; 42 pages; Jan. 17, 2008; IEEE P802.1Qat—Stream Reservation Protocol; pp. 1-3.

IEEE P802.1AS/D2.0; Draft Standard for local and Metropolitan Area Netowrks—Timing and Synchronization for Time-Sensitive Applications in Bridged Local ARea Netowrks; Sponsor LAN/MAN Standards Committee of the IEEE Computer Society; Prepared by the Interworking Task Group of IEEE 802.1; 204 pages; Feb. 22, 2008; IEEE 802.1AS—Timing and Synchronization; pp. 1-6.

International Standard IEC 61508(E): 2004; First Edition Sep. 2004; IEEE 1588(E)TM 2002; Precision Clock Synchronization Protocol for Network Measurement and Control Systems Sponsor TC9—Technical Committee on Sensor Technology of the IEEE Instrumentation and Measurement Society; Approved Sep. 12, 2002; IEEE-SA Standards Board; 158 pages.

IEEE Std 1394-1995; IEEE Standard for a High Performance Serial Bus; Sponsor Microprocessor and Microcomputer Standard Committee of the IEEE Computer Society; Approved Dec. 12, 1995; IEEE Standard Board; Approved Jul. 22, 1996; American National Standards Institute; 392 pages.

IEEE Std 802.10-1998 (Revision IEEE Std 802.10-1992, incorporating IEEE Std. 802.10b-1992, 802.10e-1993, 802.10f-1993, 802.10g-1995, and 802.10h-1997) IEEE Standards fo Local and Metropolitan Area Networks: Standard for Interoperable LAN/MAN Security (SILS); LAN MAN Standards Committee of the IEEE Computer Society, Approved Sep. 17, 1998 by the IEEE SA—Standards Board, 116 pages.

IEEE Std 802.10ef-1993 and IEEE Std 802.10f-1993 (Supplements to IEEE Std 802.10-1992) IEEE Standards for Local and Metropolitan Area Networks: Supplements to Standard for Interoperable LAN/MAN Security (SILS), Secure Data Excahnge (SDE) Sublayer Management (Subclause 2.8) and Recommended Practice for SDE on Ethernet V2.0 in IEEE 802 LANs (Annex 2H); Technical Committee on Computer Communications of the IEEE Computer Society; Approved Dec. 2, 1993 by the IEEE Standards Board; 48 pages.

IEEE Std 802.10g-1995 (Supplement to IEEE Std 802.10-1992) IEEE Standard for Local and Metropolitan Area Networks: Supplement to Standard for Interoperable LAN/MAN Security (SILS): Secure Data Exchange (SDE)—Security Label (Annexes 2I, 2J, and 2K), IEEE Computer Society, Apr. 16, 1996, 34 pages.

ISO/IEC Final CD 15802-3, IEEE P802.1D/D15, Nov. 24, 1997, Information Technology—Telecommunications and information exchange between systems—Local and metropolitan area networks—Common Specifications—Part 3: Media Access Control (MAC) Bridges: Revision (Incorporating IEEE 802.1p: Traffic Class Expediting and Dyanmic Multicast Filtering), LAN MAN Standards Committee of the IEEE Computer Society; 381 pages.

IEEE Std 802.3-2002 (Revision of IEEE Std 802.3 2000 Edition) IEEE Standard for Information Technology—Telecommunications and information exchange between systems—Local and metropolitan area networks—Specific Requirements, Part 3: Carrier sense multiple access with collision detection (CSMA/CD) access method and physical layer specifications; IEEE Computer Society; LAN/MAN Standards Committee; Mar. 8, 2002; 578 pages.

802.3-2002 Part 2—Information Technology—Telecommunications and information exchange between systems—Local and metropolitan area networks—Specific Requirements—Part 3: Carrier Sense Multiple Access with Collision Detection (CSMA/CD) access method and physical layer specifications; Section Two; This section includes Clauses 21 through 33 and Annexes 22A through 32A.

802.3-2002 Part 3—Information Technology—Telecommunications and information exchange between systems—Local and metropolitan area networks—Specific Requirements—Part 3: Carrier Sense Multiple Access with Collision Detection (CSMA/CD) access method and physical layer specifications—Section Three; This section includes Clauses 34 through 43 and Annexes 36A through 43C.

IEEE Std 802.3ac-1998 (Supplement to IEEE Std 802.3 1998 Edition) Information technology—Telecommunications and information exchango between systems—Local and metropolitan area networks—Specific requirements—Supplement to Carrier Sense Multiple Access with Collision Detection (CSMA/CD) Access Method and Physical Layer Specifications—Frame Extensions for Virtual Bridged Local Area Network (VLAN) Tagging on 802.3 Networks; LAN MAN Standards Committee of the IEEE Computer Society; Approved Sep. 16, 1998 by the IEEE—SA Standards Board; 19 pages.

O Feuser et al., "On the Effects of the IEEE 802.3x Flow Control in Full-Duplex Ethernet LANs," Conference on Local Computer Networks, Oct. 1999, pp. 160-161.

W. Noureddine et al., "Selective BAck-Pressure in Switched Ethernet LANs," Global Telecommunications Conference, 1999, vol. 2, pp. 1256-1263.

D. Lee et al., "FLOAX—Flow-Rate Based Hop by Hop Backpressure Control for IEEE 802.3x," 5th IEEE International Conference on High Speed Networks and Multimedia Communications, Jul. 2002, pp. 202-207.

* cited by examiner

AUTO-SYNTONIZATION AND TIME-OF-DAY SYNCHRONIZATION FOR MASTER-SLAVE PHYSICAL LAYER DEVICES

CROSS-REFERENCE TO RELATED APPLICATIONS

This application claims the benefit of U.S. Provisional Application No. 61/295,923, filed on Jan. 18, 2010.

This application is related to U.S. patent application Ser. No. 11/873,377, filed Oct. 16, 2007, and U.S. Pat. No. 7,730,230 issued Jun. 1, 2010.

The disclosures of the above applications and patent are incorporated herein by reference in their entirety.

FIELD

The present disclosure relates generally to communication systems and more particularly to auto-syntonization and time-of-day synchronization of master-slave physical layer devices.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Two clocks are syntonized if the duration of one second (i.e., one unit of time) is the same for both clocks. When two clocks are syntonized, the time measured by each clock advances at the same rate. The two clocks may or may not share the same epoch (i.e., origin of a timescale). Two clocks are synchronized to a specified uncertainty if (1) the two clocks have the same epoch, and (2) measurements of time of a single event at an arbitrary time made using the two clocks differ by no more than the specified uncertainty.

Network devices use clock signals generated by local oscillators to calculate time of day and to timestamp packets with the time of day. The timing of the clock signals can differ from one network device to another due to variations in the local oscillators. For each network device to have the same time of day, the clock signals of the network devices need to be synchronized.

Various techniques are used to synchronize the clock signals of network devices. Within a domain, the clock signals ultimately derive respective timing from a grandmaster clock, which is the ultimate source of time for clock synchronization. The clock signals typically derive the timing from the grandmaster clock using a precision time protocol (PTP). The PTP is defined in IEEE Std 1588™-2008 standard, which is incorporated herein by reference in its entirety.

SUMMARY

A network device includes a master physical layer and a slave physical layer device configured to communicate with a plurality of network devices. The master physical layer device includes a signal generator module configured to generate a first clock that is syntonized to a grandmaster clock having a fixed frequency; and a frequency adjusting module configured to, at a predetermined time interval, adjust a frequency of the first clock to the fixed frequency of the grandmaster clock. The slave physical layer device includes a time of day calculating module configured to calculate a first time of day of the slave physical layer device based on a second clock that is asynchronous to the first clock, and a period adjusting module configured to synchronize the first time of day to a second time of day of the master physical layer device based on the predetermined time interval.

A method includes, in a master physical layer device of a network device, generating a first clock that is syntonized to a grandmaster clock having a fixed frequency, and at a predetermined time interval, adjusting a frequency of the first clock to the fixed frequency of the grandmaster clock. The method further includes, in a slave physical layer device of the network device, calculating a first time of day of the slave physical layer device based on a second clock that is asynchronous to the first clock, and synchronizing the first time of day to a second time of day of the master physical layer device based on the predetermined time interval.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

Figure 1:
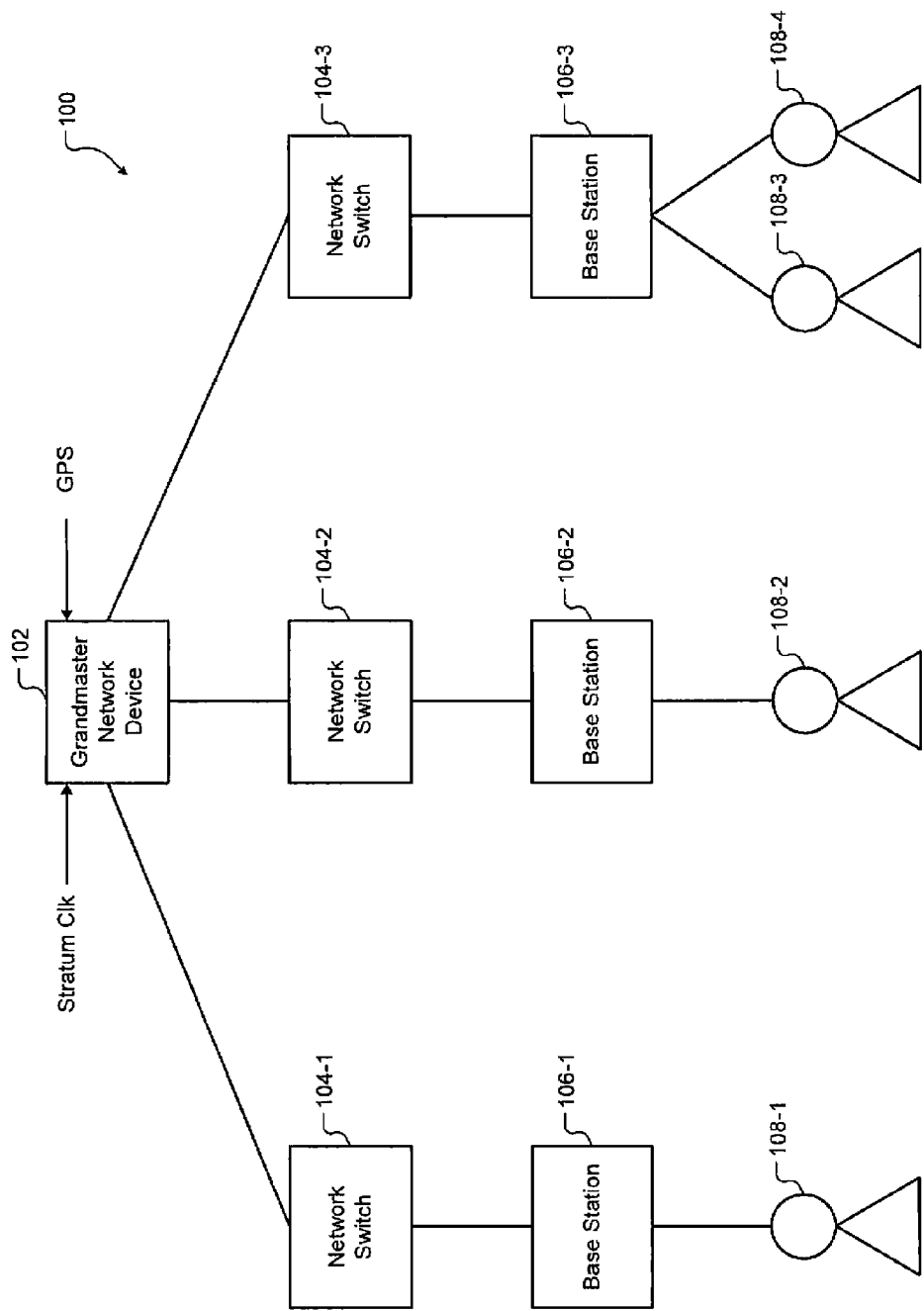
FIG. 1 is a schematic of a network having a hierarchical network topology.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

When base stations in a network communicate using time-division multiplexing (TDM), the clock frequency and time of day of the base stations are synchronized. The clock frequency is typically synchronized using a stratum clock. The time of day is typically synchronized using a global positioning system (GPS). When the clock frequency and time of day of the base stations are synchronized, the base stations can correctly communicate in the allotted time slots. Additionally, the base stations can interleave, multiplex, and handover data synchronously when the clock frequency and time of day of the base stations are synchronized.

In hierarchical Ethernet networks using the precision time protocol (PTP) defined in the IEEE Std 1588™-2008 standard, one network device typically functions as a grandmaster network device while other base stations function as slaves. The grandmaster network device typically derives a master clock of a fixed frequency from a stratum clock. Additionally, the grandmaster network device typically calculates time of day using a GPS.

Each base station ultimately communicates with the grandmaster network device. Each base station synchronizes a frequency of the respective base station to the fixed frequency of the grandmaster clock using the PTP. Additionally, each base station determines how far the respective base station is from the grandmaster network device in terms of time and calculates a local time of day of the respective base station using the PTP. Thus, each base station is frequency locked and time-of-day locked to the grandmaster network device. Additionally, using the PTP, each base station determines differences between the local time of day of the respective base station and the local time of day of other base stations.

Referring now to FIG. 1, a network 100 having a hierarchical network topology is shown. The network 100 includes a grandmaster network device 102 that communicates with network switches 104-1, 104-2, and 104-3 (collectively network switches 104). The network 100 further includes base stations 106-1, 106-2, and 106-3 (collectively base stations 106). The base stations 106 communicate with service providers 108-1, 108-2, 108-3, and 108-4 (collectively service providers 108). The base stations 106 communicate with the grandmaster network device 102 via the network switches 104. The base stations 106 function as slaves.

The grandmaster network device 102 derives a grandmaster clock of a fixed frequency from a stratum clock. The grandmaster network device 102 calculates time of day using a GPS. Using the PTP, each base station 106 synchronizes a clock of the respective base station 106 to the grandmaster clock and calculates a local time of day of the respective base station 106. Additionally, using the PTP, each base station 106 determines differences between the local time of day of the respective base station 106 and the local time of day of other base stations 106.

The network switches 104 and the base stations 106 may be generally referred to as network devices. Each network device has a master port and a slave port. Each network device communicates with an upstream network device via the master port. Each network device communicates with a downstream network device via the slave port. For example, the master port of an upstream network device (e.g., the grandmaster network device 102) communicates with the slave port of a downstream network device (e.g., the network switches 104), and so on.

Figure 2:
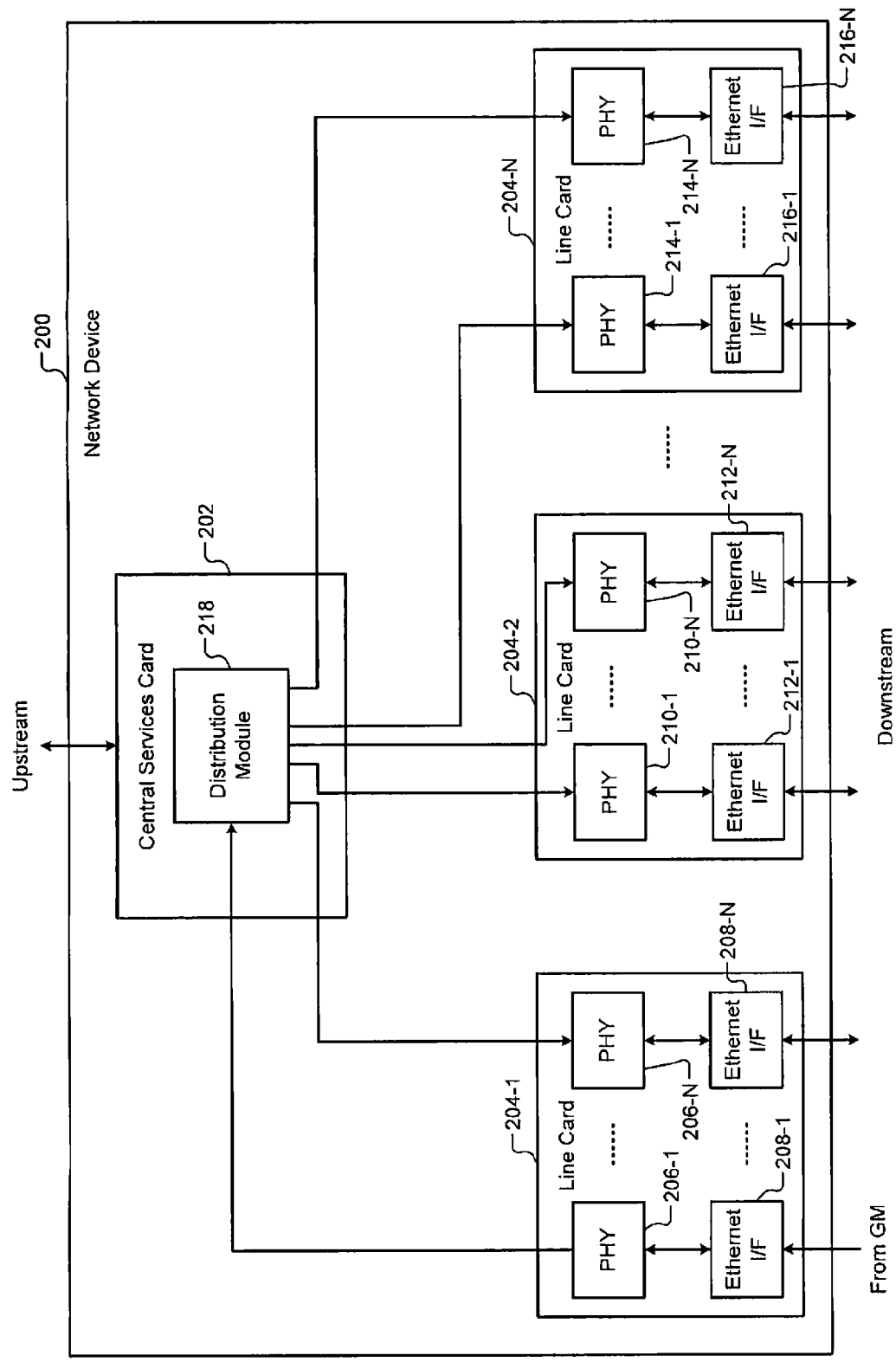
FIG. 2 is a functional block diagram of a network device comprising a distribution module that distributes a reference clock and time of day to physical layer devices (PHYs)

Referring now to FIG. 2, a network device 200 synchronizes a clock frequency and calculates local time of day as follows. The network device 200 communicates upstream with the grandmaster network device and downstream with another network device or a service provider. For example, the network device 200 may be one of the network switches 104 or one of the base stations 106 shown in FIG. 1.

The network device 200 includes a central services card 202 and a plurality of line cards 204-1, 204-2, . . . , and 204-N (collectively line cards 204), where N is an integer greater than 1. The central services card 202 communicates with a network device upstream from the network device 200. The line cards 204 communicate with the central services card 202. Additionally, the line cards 204 communicate with a network device downstream from the network device 200.

The line card 204-1 includes physical layer devices (PHYs) 206-1, . . . , and 206-N (collectively PHYs 206). Additionally, the line card 204-1 includes Ethernet interfaces 208-1, . . . , and 208-N (collectively Ethernet interfaces 208). The Ethernet interfaces 208 communicate with the PHYs 206. Additionally, the Ethernet interfaces 208 communicate with the network device downstream from the network device 200. The other line cards 204 also include PHYs (e.g., PHYs 210-1, 214-1, etc.) and Ethernet interfaces (e.g., Ethernet interfaces 212-1, 216-1, etc.) as shown.

In the line card 204-1, the Ethernet interface 208-1 communicates with an upstream master network device (e.g., the grandmaster network device). The Ethernet interface 208-1 receives data including the clock frequency of the grandmaster clock and time of day of the grandmaster network device 102 from the upstream master network device. Based on the data received, the PHY 206-1 generates a clock that determines the frequency of operation of the Ethernet interface 208-1.

The clock is output to a distribution module 218 of the central services card 202. The distribution module 218 outputs the clock to the other PHYs of the network device 200. Thus, the PHYs and the Ethernet interfaces of the network device 200 have the same frequency of operation as the clock frequency of the grandmaster network device 102.

Additionally, the distribution module 218 calculates a local time of day for the network device 200 based on the data received from the grandmaster network device 102. The distribution module 218 outputs the same local time of day to each PHY of the network device 200. When the network interfaces of the network device 200 transmit packets, the packets are time stamped using the same local time of day. Accordingly, a network device downstream from the network device 200 can derive a local time of day correctly based on the packets received from the Ethernet interfaces of the network device 200.

Figure 3:
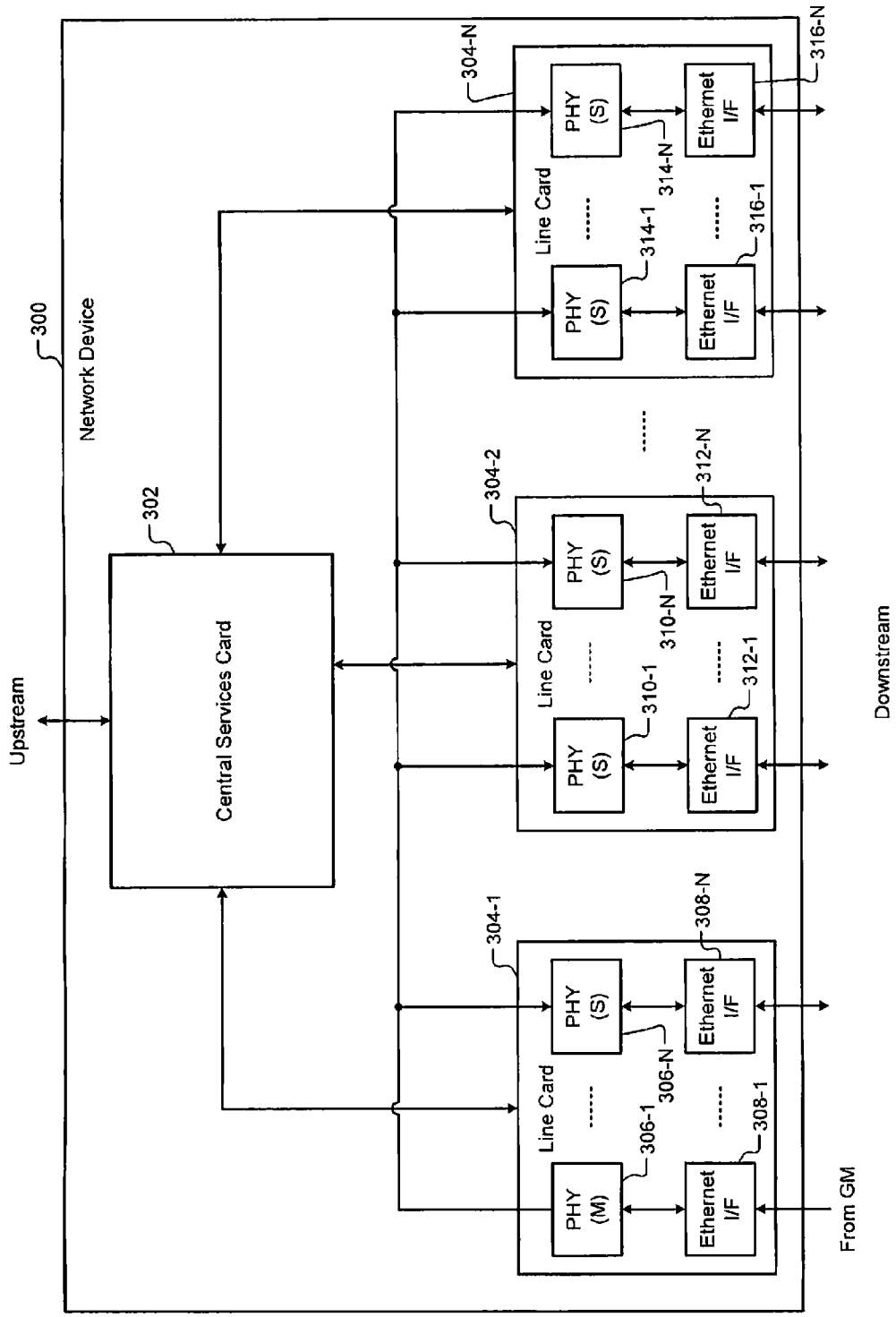
FIG. 3 is a functional block diagram of a network device comprising a master PHY that generates a syntonized clock and slave PHYs that generate time of day synchronized to the master PHY.

Referring now to FIG. 3, a network device 300 according to the present disclosure is shown. The network device 200 communicates upstream with the grandmaster network device 102 and downstream with another network device or a service provider. For example, the network device 300 may be one of the network switches 104 or one of the base stations 106 shown in FIG. 1.

The network device 300 includes a central services card 302 and a plurality of line cards 304-1, 304-2, . . . , and 304-N (collectively line cards 304), where N is an integer greater than 1. The central services card 302 communicates with a network device upstream from the network device 300. The line cards 304 communicate with the central services card 302. Additionally, the line cards 304 communicate with a network device downstream from the network device 300.

The line card 304-1 includes physical layer devices (PHYs) 306-1, . . . , and 306-N (collectively PHYs 306). Additionally, the line card 304-1 includes Ethernet interfaces 308-1, . . . , and 308-N (collectively Ethernet interfaces 308). The Ethernet interfaces 308 communicate with the PHYs 306. Additionally, the Ethernet interfaces 308 communicate with the network device downstream from the network device 300. The other line cards 304 also include PHYs (e.g., PHYs 310-1, 314-1, etc.) and Ethernet interfaces (e.g., Ethernet interfaces 312-1, 316-1, etc.) as shown.

In the line card 304-1, the Ethernet interface 308-1 communicates with an upstream master network device (e.g., the grandmaster network device). Therefore, the PHY 306-1 is configured to operate as a master PHY (shown as PHY (M)). Other PHYs of the line cards 304 are configured to operate as slave PHYs (each shown as PHY (S)).

In the network device 300, the clock frequency and time of day are not distributed to each PHY from a distribution module of the central services card 302. Therefore, the central services card 302 does not include a distribution module. Instead, as explained below, the master PHY 306-1 syntonizes a clock of the master PHY 306-1 to the grandmaster clock and outputs the syntonized clock to the slave PHYs. Additionally, as explained below, the slave PHYs calculate local time of day of the respective slave PHYs based on the syntonized clock.

Figure 4:
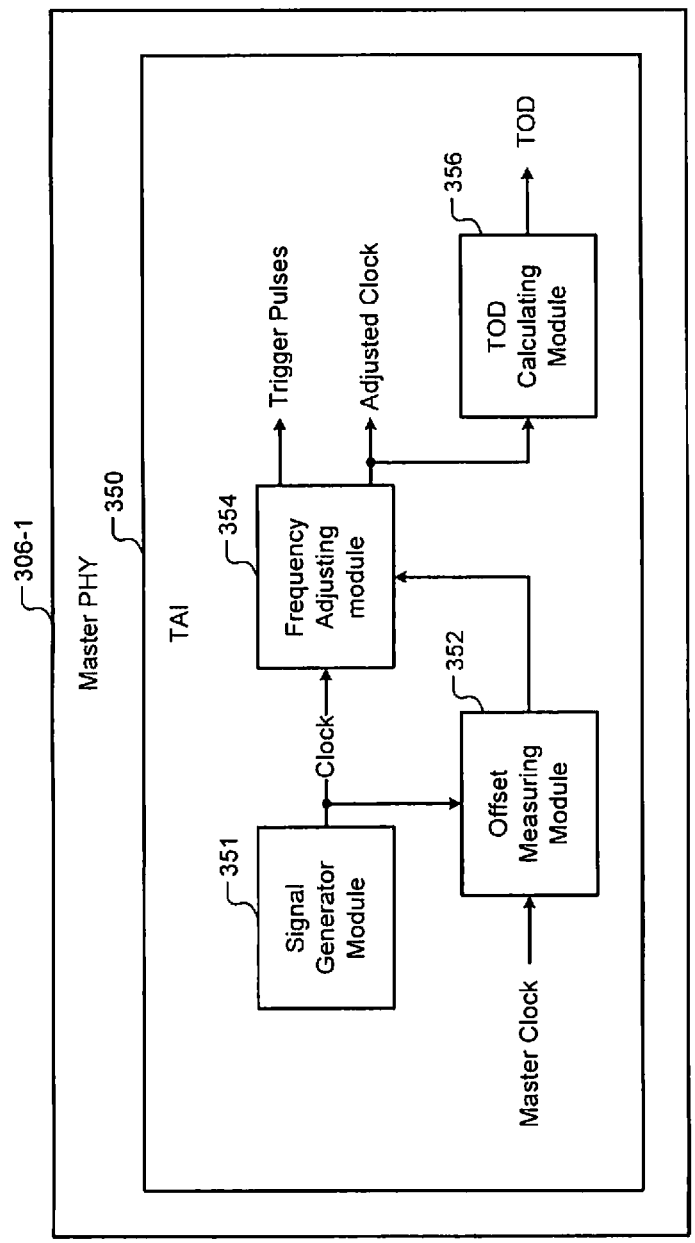
FIG. 4 is a functional block diagram of the master PHY shown in FIG. 3.

Referring now to FIG. 4, the master PHY 306-1 is shown in detail. The master PHY 306-1 includes a time application interface (TAI) 350. The TAI 350 includes a signal generator module 351, an offset measuring module 352, a frequency adjusting module 354, and a time of day (TOD) calculating module 356. The signal generator module 351 is a programmable frequency signal generator that generates a local clock of the master PHY 306-1. The offset measuring module 352 receives a master clock (e.g., the grandmaster clock) from an upstream master network device (e.g., the grandmaster network device). The offset measuring module 352 calculates a frequency offset between the frequency of the grandmaster clock and the frequency of the local clock of the master PHY 306-1.

The frequency adjusting module 354 adjusts the frequency of the local clock of the master PHY 306-1 based on the frequency offset. The frequency adjusting module 354 generates an adjusted clock that is syntonized to the grandmaster clock. The frequency of the adjusted clock is equal to the frequency of the grandmaster clock. The master PHY 306-1 outputs the adjusted clock to the slave PHYs of the network device 300. The TOD calculating module 356 calculates local time of day of the master PHY 306-1 based on the adjusted clock.

The frequency adjusting module 354 adjusts the frequency of the local clock of the master PHY 306-1 periodically (e.g., once every second). That is, the frequency adjusting module 354 updates the adjusted clock at a predetermined time interval (e.g., once every second). The frequency adjusting module 354 generates a trigger pulse each time the frequency of the local clock of the master PHY 306-1 is updated. Accordingly, the frequency adjusting module 354 generates trigger pulses at the predetermined time interval. As explained below, when the slave PHYs receive the trigger pulses, the slave PHYs lock the respective local time of day to the local time of day of the master PHY 306-1.

Figure 5:
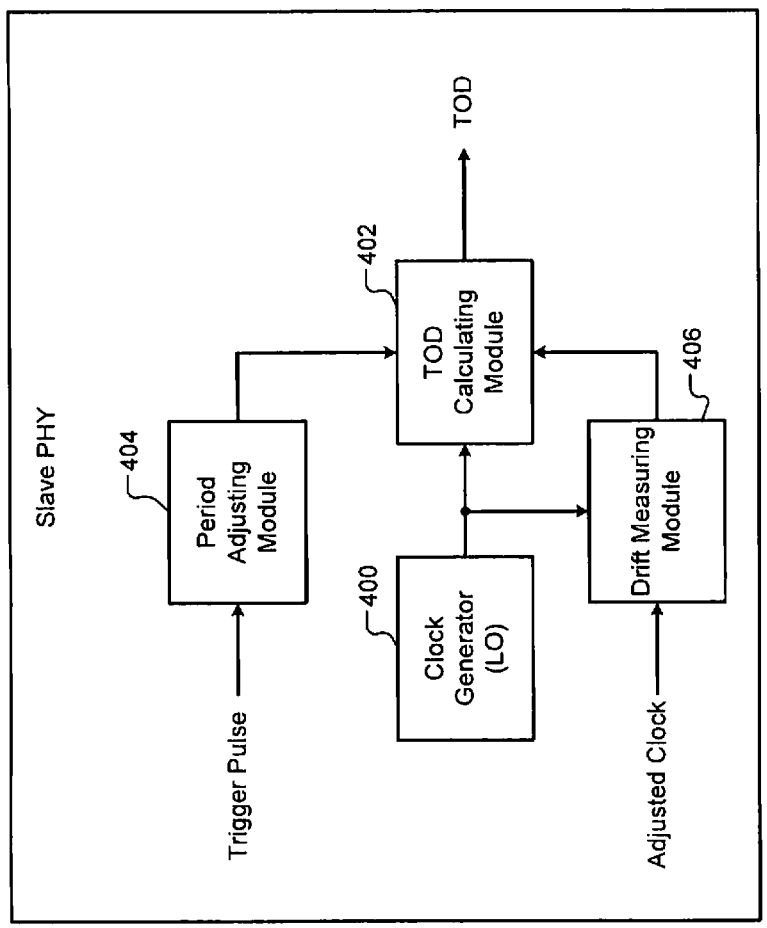
FIG. 5 is a functional block diagram of a slave PHY shown in FIG. 3.

Referring now to FIG. 5, a slave PHY (e.g., PHY 304-N, 310-1, etc.) of the network device 300 is shown in detail. The slave PHY includes a clock generator 400, a time-of-day (TOD) calculating module 402, a period adjusting module 404, and a drift measuring module 406. The clock generator 400 generates a local clock of the slave PHY. The TOD calculating module 402 calculates local time of day of the slave PHY based on the local clock of the slave PHY.

The local clock of the slave PHY, however, is generated using a local oscillator. Therefore, due to variations in the local oscillator, the timing of the local clock of the slave PHY may drift relative to the timing of the grandmaster clock. Accordingly, the local time of day of the slave PHY may differ from the local time of day of the master PHY 306-1. The period adjusting module 404 adjusts the local time of day of the slave PHY to match the local time of day of the master PHY 306-1 as follows.

Suppose that the master PHY 306-1 updates the adjusted clock and outputs the trigger pulses every one second. That is, the predetermined time interval at which the master PHY 306-1 updates the adjusted clock and generates the trigger pulses is one second. The period adjusting module 404 receives the trigger pulses from the master PHY 306-1 every one second, where the one second is based on the time of day measured by the master PHY 306-1. The master PHY 306-1 outputs to the slave PHYs a reference value that corresponds to one second of time of day of the master PHY 306-1. The period adjusting module 404 stores the reference value.

When the trigger pulses are received by the slave PHY, the period adjusting module 404 measures the time interval between successive trigger pulses using the local clock of the slave PHY. Due to drift, the measured time interval may differ from one second of time of day of the master PHY 306-1. The period adjusting module 404 calculates a difference between the measured time interval and the reference value. Based on the difference, the period adjusting module 404 adjusts one second of time of day measured using the local clock of the slave PHY. Thus, the period adjusting module 404 synchronizes the local time of day of the slave PHY to the time of day of the master PHY 306-1.

Other slave PHYs of the network device 300 similarly synchronize the respective local time of day to the local time of day of the master PHY 306-1. Since the local time of day of each slave PHY is synchronized to the local time of day of the master PHY 306-1, adjusting clock frequencies of the slave PHYs is unnecessary.

The frequency at which the adjusted clock output by the master PHY 306-1 is updated controls the drift between the local clock of a slave PHY and the grandmaster clock. The drift measuring module 406 measures the drift (i.e., deviation) between the local clock of the slave PHY and the adjusted clock received from the master PHY 306-1. Since the adjusted clock is syntonized to the grandmaster clock, the drift measuring module 406 effectively measures the drift between the local clock of the slave PHY and the grandmaster clock.

When the drift is greater than or equal to a predetermined threshold, the drift measuring module 406 generates a control signal. When the control signal is generated, the period adjusting module 404 adjusts a time period counted using the local clock of the slave PHY. The amount by which the period adjusting module 404 adjusts the time period depends on the amount of drift.

The master PHY 306-1 and the slave PHYs measure the drift and compensate for the drift as follows. Each PHY includes a time application interface (TAI). The TAI has three registers. A first register stores time of day counted in seconds. The time of day is counted based on universal time. A second register stores time of day in fractions of a second. For example, the second register may store time of day in nanoseconds. A third register may store fractions of a nanosecond. Due to drift, the time of day measured by one PHY may differ slightly from the time of day measured by another PHY.

In the master PHY 306-1, the drift is compensated by adding or subtracting fractions of nanoseconds from the third register to/from the nanoseconds of the second register. The number of fractions of nanoseconds added or subtracted to/from the nanoseconds depends on the difference between frequencies of the grandmaster clock and the local clock of the master PHY 306-1.

In a slave PHY, the difference between frequencies of the adjusted clock received from the master PHY 306-1 and the local clock of the slave PHY is measured. The difference is loaded in the third register. The value from the third register is added or subtracted to/from the second register to compensate for the drift. The procedure is repeated until the amount of drift reduces to a value within a predetermined range. When the amount of drift reduces to a value within a predetermined range, the time of day of the slave PHY is considered to be locked (i.e., synchronized) to the time of day of the master PHY 306-1.

In some implementations, based on the adjusted clock, the master PHY 306-1 (e.g., the frequency adjusting module 354) is programmed with a predetermined time interval at which the trigger pulses are generated. The slave PHYs are programmed with an expected interval at which the trigger pulses are received from the master PHY 306-1. For example, in a slave PHY, the period adjusting module 404 is programmed with the expected interval. In the slave PHY, the period adjusting module 404 performs the following operations generally attributed to the slave PHY.

The slave PHY captures a first value of the local time of day of the slave PHY when a trigger pulse is received. The slave PHY captures a second value of the local time of day of the slave PHY when a next trigger pulse is received. A difference between the first value and the second value is compared to the expected interval. The local time of day of the slave PHY is adjusted (increased or decreased) when the difference is greater than a predetermined threshold.

The above process is repeated until the difference is less than or equal to a predetermined threshold. When the difference is less than or equal to a predetermined threshold, the local time of day of the slave PHY is considered to be locked i.e., synchronized) to the local time of day of the master PHY 306-1.

Figure 6:
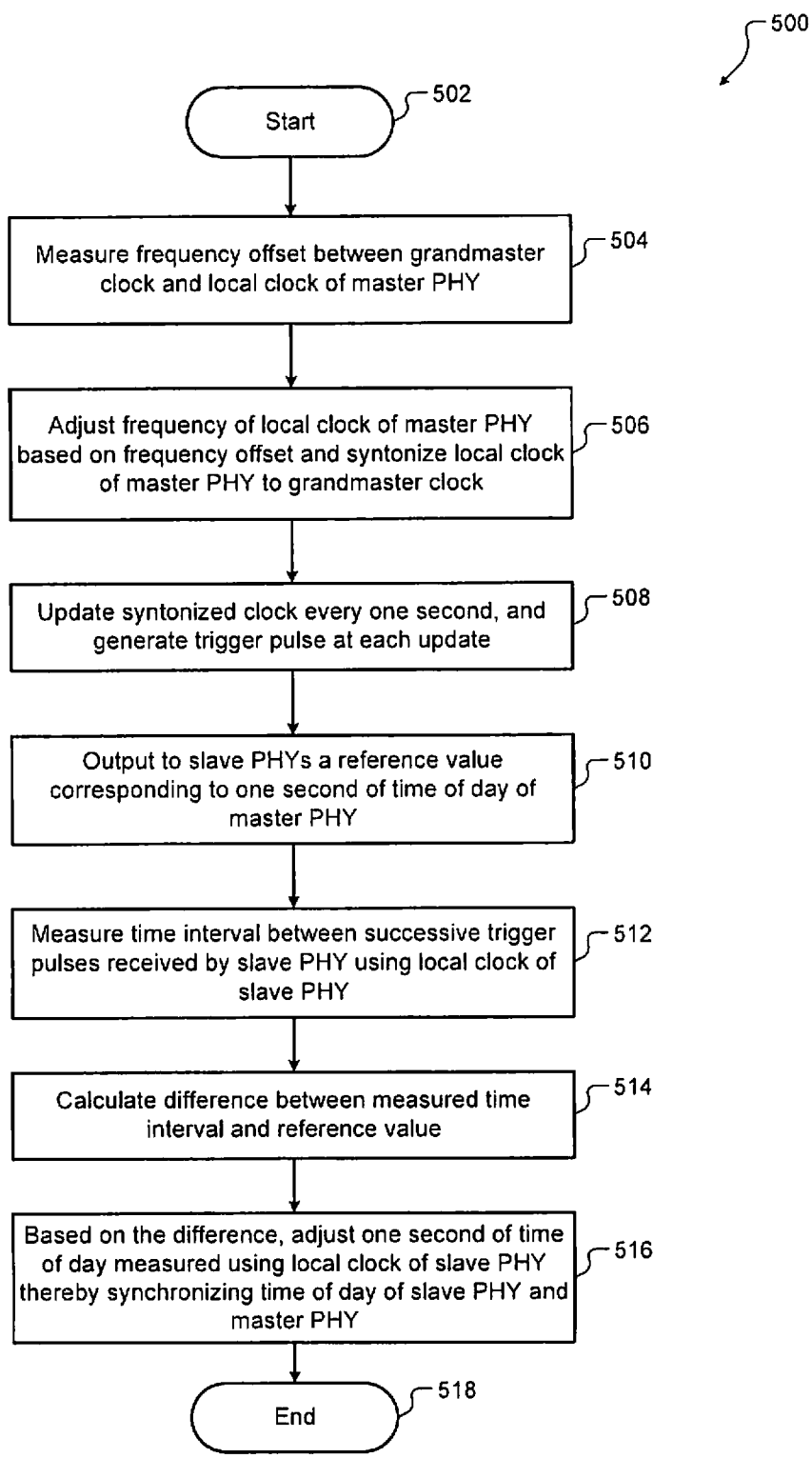
FIG. 6 is a flowchart of a method for syntonizing clock of the master PHY and synchronizing time of day of the slave PHY to time of day of the master PHY.

Referring now to FIG. 6, a method 500 for syntonizing a local clock of a master PHY and synchronizing time of day of a slave PHY to the time of day of the master PHY is shown. Control begins at 502. At 504, control measures a frequency offset between the grandmaster clock and the local clock of the master PHY. At 506, control adjusts the frequency of the local clock of the master PHY based on the frequency offset and syntonizes the local clock of the master PHY to the grandmaster clock.

At 508, control updates the syntonized clock at a predetermined time interval (e.g., every one second) and generates a trigger pulse at every update. At 510, control outputs to the slave PHYs a reference value corresponding to one second of time of day of the master PHY (i.e., the predetermined time interval).

At 512, control measures a time interval between successive trigger pulses received by the slave PHY using the local clock of the slave PHY. At 514, control calculates a difference between the measured time interval and the reference value. At 516, based on the difference, control adjusts one second of time of day measured using the local clock of the slave PHY, thereby synchronizing the time of day of the slave PHY to the time of day of the master PHY.

Since the time of day of the master PHY 306-1 and the time of day of the slave PHYs are synchronized, the master PHY 306-1 and the slave PHYs can transmit packets with synchronized timestamps. That is, the master PHY 306-1 and the slave PHYs generate timestamps using synchronized time of day when transmitting packets.

In some implementations, the master PHY 306-1 and/or the slave PHYs may transmit packets in an interleaved mode or a multiplexed mode. For example, in the interleaved mode, transmission of packets via the master PHY 306-1 and one or more slave PHYs may be interleaved. Alternatively, transmission of packets via two or more slave PHYs may be interleaved. In the multiplexed mode, transmission of packets via the master PHY 306-1 and one or more slave PHYs may be multiplexed. Alternatively, transmission of packets via two or more slave PHYs may be multiplexed. In the interleaved mode or the multiplexed mode, the master PHY 306-1 and/or the slave PHYs can transmit packets with synchronized timestamps.

In other implementations, a first PHY may handover packet transmission to a second PHY. For example, the master PHY 306-1 may handover packet transmission to a slave PHY or vice versa. Alternatively, one slave PHY may handover packet transmission to another slave PHY. After handover, the second PHY can transmit subsequent packets with timestamps that are synchronized with timestamps of packets transmitted by the first PHY before the handover.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:
1. A network device comprising:
 a master physical layer device configured to communicate with a plurality of network devices, the master physical layer device including
  a signal generator module configured to generate a first clock that is syntonized to a grandmaster clock having a fixed frequency, and
  a frequency adjusting module configured to, at a predetermined time interval, adjust a frequency of the first clock to the fixed frequency of the grandmaster clock; and
 a slave physical layer device configured to communicate with the plurality of network devices, the slave physical layer device including
  a time of day calculating module configured to calculate a first time of day of the slave physical layer device based on a second clock that is asynchronous to the first clock, and a period adjusting module configured to synchronize the first time of day to a second time of day of the master physical layer device based on the predetermined time interval, wherein the frequency adjusting module is further configured to output N control signals to the slave physical layer device when the first clock is updated N times, respectively, where N is an integer greater than 1, and output to the slave physical layer device a reference value corresponding to the predetermined time interval; and wherein the period adjusting module is further configured to capture a first value of the first time of day when a first of the N control signals is received, capture a second value of the first time of day when a second of the N control signals is received, calculate a first difference between the first value and the second value, calculate a second difference between the first difference and the reference value, and synchronize the first time of day to the second time of day based on the second difference.

2. The network device claim 1, wherein the master physical layer device further includes an offset measuring module configured to:

receive the grandmaster clock, and calculate a frequency offset between i) the fixed frequency of the grandmaster clock and ii) the frequency of the first clock, wherein the frequency adjusting module is configured to syntonize the first clock to the grandmaster clock based on the frequency offset.

3. The network device of claim 1, wherein the slave physical layer device further includes a drift measuring module configured to:

measure an amount of drift between the second clock and the first clock, wherein the period adjusting module is further configured to adjust a time period counted using the second clock by an amount of time when the amount of drift is greater than or equal to a predetermined threshold, and wherein the amount of time depends on the amount of drift.

4. The network device of claim 3, wherein the amount of drift is proportional to the predetermined time interval.

5. The network device of claim 1, wherein:

the master physical layer device is configured to transmit a first packet at a first time, wherein
the first packet includes a first timestamp corresponding to the first time, and
the first timestamp is generated based on the second time of day; and the slave physical layer device is configured to transmit a second packet at a second time, wherein
the second packet includes a second timestamp corresponding to the second time,
the second timestamp is generated based on the first time of day, and
the second timestamp is synchronized to the first timestamp.

6. The network device of claim 1, wherein the master physical layer device and the slave physical layer device are configured to:

operate in an interleaved mode or a multiplexed mode, and transmit packets with synchronized timestamps in the interleaved mode or the multiplexed mode.

7. The network device of claim 5, wherein:

the master physical layer device is configured to handover transmission of a third packet to the slave physical layer device, wherein the third packet is transmitted subsequent to the first packet; and the slave physical layer device is configured to transmit the third packet at a third time, wherein
the third packet includes a third timestamp corresponding to the third time,
the third timestamp is generated based on the first time of day, and
the third timestamp is synchronized to the first timestamp.

8. The network device of claim 5, wherein:

the slave physical layer device is configured to handover transmission of a third packet to the master physical layer device, wherein the third packet is transmitted subsequent to the second packet; and the master physical layer device is configured to transmit the third packet at a third time, wherein
the third packet includes a third timestamp corresponding to the third time,
the third timestamp is generated based on the second time of day, and
the third timestamp is synchronized to the second timestamp.

9. The network device of claim 1, further comprising a line card that includes the master physical layer device and the slave physical layer device.

10. The network device of claim 1, further comprising:

a first line card that includes the master physical layer device; and a second line card that includes the slave physical layer device.

11. A method comprising:

in a master physical layer device of a network device, generating a first clock that is syntonized to a grandmaster clock having a fixed frequency, and at a predetermined time interval, adjusting a frequency of the first clock to the fixed frequency of the grandmaster clock;

in a slave physical layer device of the network device, calculating a first time of day of the slave physical layer device based on a second clock that is asynchronous to the first clock, and synchronizing the first time of day to a second time of day of the master physical layer device based on the predetermined time interval;

outputting N control signals to the slave physical layer device when the first clock is updated N times, respectively, where N is an integer greater than 1;

outputting to the slave physical layer device a reference value corresponding to the predetermined time interval;

capturing a first value of the first time of day when a first of the N control signals is received at the slave physical layer device;

capturing a second value of the first time of day when a second of the N control signals is received at the slave physical layer device;

calculating a first difference between the first value and the second value;

calculating a second difference between the first difference and the reference value; and synchronizing the first time of day to the second time of day based on the second difference.

12. The method claim 11, further comprising:

receiving the grandmaster clock;

calculating a frequency offset between i) the fixed frequency of the grandmaster clock and ii) the frequency of the first clock; and syntonizing the first clock to the grandmaster clock based on the frequency offset.

13. The method of claim 11, further comprising:

measuring an amount of drift between the second clock and the first clock; and adjusting a time period counted using the second clock by an amount of time when the amount of drift is greater than or equal to a predetermined threshold, wherein the amount of time depends on the amount of drift.

14. The method of claim 11, further comprising:

transmitting a first packet at a first time from the master physical layer device, wherein the first packet includes a first timestamp corresponding to the first time, and wherein the first timestamp is generated based on the second time of day; and transmitting a second packet at a second time from the slave physical layer device, wherein the second packet includes a second timestamp corresponding to the second time, the second timestamp is generated based on the first time of day, and the second timestamp is synchronized to the first timestamp.

15. The method of claim 11, further comprising:

operating the master physical layer device and the slave physical layer device in an interleaved mode or a multiplexed mode; and transmitting packets with synchronized timestamps in the interleaved mode or the multiplexed mode.

16. The method of claim 14, further comprising:

handing over transmission of a third packet from the master physical layer device to the slave physical layer device, wherein the third packet is transmitted subsequent to the first packet; and transmitting the third packet at a third time from the slave physical layer device, wherein the third packet includes a third timestamp corresponding to the third time, the third timestamp is generated based on the first time of day, and the third timestamp is synchronized to the first timestamp.

17. The method of claim 14, further comprising:

handing over transmission of a third packet from the slave physical layer device to the master physical layer device, wherein the third packet is transmitted subsequent to the second packet; and transmitting the third packet at a third time from the master physical layer device, wherein the third packet includes a third timestamp corresponding to the third time, the third timestamp is generated based on the second time of day, and the third timestamp is synchronized to the second timestamp.

* * * * *